(12) United States Patent
Gore et al.

(10) Patent No.: US 8,768,732 B2
(45) Date of Patent: Jul. 1, 2014

(54) SYSTEM AND METHOD OF MANAGING AN INSURANCE SCHEME

(75) Inventors: Adrian Gore, Houghton Estate (ZA); Herschel Phillip Mayers, Johannesburg (ZA); Kenneth Steven Rabson, Johannesburg (ZA)

(73) Assignee: Discovery Holdings Limited, Sandton (ZA)

( * ) Notice: Subject to any disclaimer, the term of this patent is extended or adjusted under 35 U.S.C. 154(b) by 839 days.

(21) Appl. No.: 12/303,399

(22) PCT Filed: May 23, 2007

(86) PCT No.: PCT/IB2007/051945
§ 371 (c)(1),
(2), (4) Date: Jun. 12, 2009

(87) PCT Pub. No.: WO2007/141695
PCT Pub. Date: Dec. 13, 2007

(65) Prior Publication Data
US 2010/0023354 A1    Jan. 28, 2010

(30) Foreign Application Priority Data

Jun. 7, 2006  (ZA) .................................. 2006/04674

(51) Int. Cl.
*G06Q 40/00* (2012.01)
(52) U.S. Cl.
USPC .......................................................... 705/4
(58) Field of Classification Search
USPC ....................................................... 705/2–4
See application file for complete search history.

(56) References Cited

U.S. PATENT DOCUMENTS

| | | | |
|---|---|---|---|
| 4,556,216 A | 12/1985 | Pitkanen | |
| 4,699,375 A | 10/1987 | Appelbaum et al. | |
| 4,831,242 A | 5/1989 | Englehardt | |
| 4,831,526 A | 5/1989 | Luchs et al. | |
| 4,837,693 A | 6/1989 | Schotz | |
| 4,860,275 A | 8/1989 | Kakinuma et al. | |
| 4,975,840 A | 12/1990 | DeTore et al. | |
| 5,062,645 A | 11/1991 | Goodman et al. | |
| 5,136,502 A | 8/1992 | Van Remortel et al. | |
| 5,297,026 A | 3/1994 | Hoffman | |

(Continued)

FOREIGN PATENT DOCUMENTS

| AU | 2001/276596 | 3/2003 |
|---|---|---|
| AU | 2005/323847 | 2/2007 |

(Continued)

OTHER PUBLICATIONS

U.S. Appl. No. 09/876,311, filed Jun. 7, 2001.

(Continued)

*Primary Examiner* — John Pauls
(74) *Attorney, Agent, or Firm* — Fleit Gibbons Gutman Bongini & Bianco, PL; Paul D. Bianco; Gary S. Winer (57) ABSTRACT

A method of managing an insurance scheme includes defining a plurality of categories of living expenses. Defining a plurality of life changing events. On the occurrence of a life changing event for an insured person of the scheme, at least partially subsidising expenses in the category of living expenses for the insured person or a nominated beneficiary of the insured person.

16 Claims, 2 Drawing Sheets

(56) References Cited

U.S. PATENT DOCUMENTS

| | | |
|---|---|---|
| 5,301,105 A | 4/1994 | Cummings, Jr. |
| 5,324,077 A | 6/1994 | Kessler et al. |
| 5,429,506 A | 7/1995 | Brophy et al. |
| 5,490,260 A | 2/1996 | Miller et al. |
| 5,521,815 A | 5/1996 | Rose |
| 5,542,420 A | 8/1996 | Goldman et al. |
| 5,549,117 A | 8/1996 | Tacklind et al. |
| 5,550,734 A | 8/1996 | Tarter et al. |
| 5,574,803 A | 11/1996 | Gaborski et al. |
| 5,630,073 A * | 5/1997 | Nolan .............................. 705/45 |
| 5,631,828 A | 5/1997 | Hagan |
| 5,655,085 A | 8/1997 | Ryan et al. |
| 5,655,997 A | 8/1997 | Greenberg et al. |
| 5,692,501 A | 12/1997 | Minturn |
| 5,722,418 A | 3/1998 | Bro |
| 5,745,893 A | 4/1998 | Hill et al. |
| 5,752,236 A | 5/1998 | Sexton et al. |
| 5,774,883 A | 6/1998 | Andersen et al. |
| 5,797,134 A | 8/1998 | McMillan |
| 5,832,467 A | 11/1998 | Wavish |
| 5,867,821 A | 2/1999 | Ballantyne et al. |
| 5,890,129 A | 3/1999 | Spurgeon |
| 5,933,809 A | 8/1999 | Hunt et al. |
| 5,933,815 A | 8/1999 | Golden |
| 5,937,387 A | 8/1999 | Summerell et al. |
| 5,956,691 A | 9/1999 | Powers |
| 5,987,434 A | 11/1999 | Libman |
| 5,991,744 A | 11/1999 | DiCrese |
| 6,021,397 A | 2/2000 | Jones |
| 6,039,688 A | 3/2000 | Douglas et al. |
| 6,049,772 A | 4/2000 | Payne et al. |
| 6,085,174 A | 7/2000 | Edelman |
| 6,085,976 A | 7/2000 | Sehr |
| 6,088,686 A | 7/2000 | Walker |
| 6,108,641 A | 8/2000 | Kenna et al. |
| 6,112,986 A | 9/2000 | Berger et al. |
| 6,151,586 A | 11/2000 | Brown |
| 6,163,770 A | 12/2000 | Gamble et al. |
| 6,230,142 B1 | 5/2001 | Benigno et al. |
| 6,338,042 B1 | 1/2002 | Paizis |
| 6,385,589 B1 | 5/2002 | Trusheim et al. |
| 6,386,444 B1 | 5/2002 | Sullivan |
| 6,513,532 B2 | 2/2003 | Mault et al. |
| 6,587,829 B1 | 7/2003 | Camarda et al. |
| 6,602,469 B1 | 8/2003 | Maus et al. |
| 6,611,815 B1 | 8/2003 | Lewis et al. |
| 6,965,868 B1 | 11/2005 | Bednarek |
| 6,980,960 B2 | 12/2005 | Hajdukiewicz et al. |
| 7,319,970 B1 | 1/2008 | Simone |
| 7,380,707 B1 | 6/2008 | Fredman |
| 7,383,223 B1 | 6/2008 | Dilip et al. |
| 7,398,217 B2 | 7/2008 | Lewis |
| 7,624,032 B2 | 11/2009 | Rabson et al. |
| 7,624,059 B1 | 11/2009 | Jaffarian et al. |
| 7,630,937 B1 | 12/2009 | Mo et al. |
| 7,664,700 B1 | 2/2010 | Fisher |
| 7,685,007 B1 | 3/2010 | Jacobson |
| 7,774,256 B1 | 8/2010 | Ryan et al. |
| 7,797,175 B2 | 9/2010 | Luedtke |
| 7,908,156 B2 | 3/2011 | Gore et al. |
| 7,953,611 B2 | 5/2011 | Goodman et al. |
| 8,010,388 B2 | 8/2011 | Joyce |
| 8,015,022 B2 | 9/2011 | Gore |
| 8,095,398 B2 | 1/2012 | Dellinger |
| 8,131,568 B2 | 3/2012 | Gore et al. |
| 8,131,570 B2 | 3/2012 | Levin et al. |
| 8,145,500 B2 | 3/2012 | Matisonn et al. |
| 8,151,916 B2 | 4/2012 | Gearhart |
| 8,185,449 B2 | 5/2012 | Ward |
| 8,185,463 B1 | 5/2012 | Ball |
| 8,190,455 B2 | 5/2012 | Gore et al. |
| 8,306,899 B2 | 11/2012 | Rabson et al. |
| 8,346,616 B2 | 1/2013 | Hwang |
| 8,359,208 B2 | 1/2013 | Slutzky et al. |
| 8,380,546 B2 | 2/2013 | Rabson et al. |
| 8,386,279 B2 | 2/2013 | Gore et al. |
| 8,457,873 B2 | 6/2013 | Hyde et al. |
| 8,598,977 B2 | 12/2013 | Maalouf et al. |
| 2001/0018664 A1 | 8/2001 | Jacoves et al. |
| 2001/0037214 A1 | 11/2001 | Raskin et al. |
| 2001/0042785 A1 | 11/2001 | Walker et al. |
| 2001/0053984 A1 | 12/2001 | Joyce |
| 2002/0002495 A1 | 1/2002 | Ullman |
| 2002/0013717 A1 | 1/2002 | Ando et al. |
| 2002/0016923 A1 | 2/2002 | Knaus et al. |
| 2002/0029158 A1 | 3/2002 | Wolff et al. |
| 2002/0035486 A1 | 3/2002 | Huyn et al. |
| 2002/0038310 A1 | 3/2002 | Reitberg |
| 2002/0042763 A1 | 4/2002 | Pillay |
| 2002/0049617 A1 | 4/2002 | Lencki et al. |
| 2002/0055859 A1 | 5/2002 | Goodman et al. |
| 2002/0087364 A1 | 7/2002 | Lerner et al. |
| 2002/0103678 A1 | 8/2002 | Burkhalter et al. |
| 2002/0111827 A1 | 8/2002 | Levin et al. |
| 2002/0116231 A1 | 8/2002 | Hele et al. |
| 2002/0116266 A1 | 8/2002 | Marshall |
| 2002/0138309 A1 | 9/2002 | Thomas |
| 2002/0152097 A1 | 10/2002 | Javors |
| 2002/0178033 A1 | 11/2002 | Yoshioka et al. |
| 2002/0184129 A1 | 12/2002 | Arena |
| 2003/0009355 A1 | 1/2003 | Gupta |
| 2003/0028483 A1 | 2/2003 | Sanders et al. |
| 2003/0033154 A1 | 2/2003 | Hajdukiewicz et al. |
| 2003/0055767 A1 | 3/2003 | Tamura et al. |
| 2003/0065561 A1 | 4/2003 | Brown |
| 2003/0065630 A1 | 4/2003 | Brown et al. |
| 2003/0105652 A1 | 6/2003 | Arena |
| 2003/0120521 A1 | 6/2003 | Sherman |
| 2003/0120570 A1 | 6/2003 | Dellinger |
| 2003/0135391 A1 | 7/2003 | Edmundson |
| 2003/0149596 A1 | 8/2003 | Bost |
| 2003/0194071 A1 * | 10/2003 | Ramian .................... 379/114.19 |
| 2003/0200101 A1 | 10/2003 | Adler |
| 2003/0200142 A1 | 10/2003 | Hicks et al. |
| 2003/0208385 A1 | 11/2003 | Zander |
| 2003/0212579 A1 | 11/2003 | Brown |
| 2003/0233278 A1 | 12/2003 | Marshall |
| 2004/0030625 A1 | 2/2004 | Rabson et al. |
| 2004/0039608 A1 | 2/2004 | Mazur |
| 2004/0039611 A1 | 2/2004 | Hong et al. |
| 2004/0059608 A1 | 3/2004 | Gore et al. |
| 2004/0088219 A1 | 5/2004 | Sanders et al. |
| 2004/0098279 A1 | 5/2004 | Frazier |
| 2004/0117302 A1 | 6/2004 | Weichert et al. |
| 2004/0138928 A1 | 7/2004 | Monk |
| 2004/0267570 A1 | 12/2004 | Becker et al. |
| 2004/0267579 A1 | 12/2004 | Markman |
| 2005/0010453 A1 | 1/2005 | Terlizzi |
| 2005/0010479 A1 | 1/2005 | Hannigan et al. |
| 2005/0033604 A1 | 2/2005 | Hogan |
| 2005/0033609 A1 | 2/2005 | Yang |
| 2005/0038679 A1 | 2/2005 | Short |
| 2005/0038681 A1 | 2/2005 | Covert |
| 2005/0055249 A1 | 3/2005 | Helitzer |
| 2005/0060209 A1 | 3/2005 | Hill |
| 2005/0071205 A1 | 3/2005 | Terlizzi |
| 2005/0102172 A1 | 5/2005 | Sirmans |
| 2005/0131742 A1 | 6/2005 | Hoffman et al. |
| 2005/0222867 A1 | 10/2005 | Underwood et al. |
| 2005/0222877 A1 | 10/2005 | Rabson et al. |
| 2005/0222878 A1 | 10/2005 | Rabson et al. |
| 2005/0228692 A1 | 10/2005 | Hodgdon |
| 2005/0234742 A1 | 10/2005 | Hodgdon |
| 2005/0240449 A1 | 10/2005 | Gore et al. |
| 2005/0256748 A1 | 11/2005 | Gore et al. |
| 2005/0288971 A1 | 12/2005 | Cassandra |
| 2006/0041454 A1 | 2/2006 | Matisonn et al. |
| 2006/0041455 A1 | 2/2006 | Dehais |
| 2006/0064320 A1 | 3/2006 | Postrel |
| 2006/0074801 A1 | 4/2006 | Pollard et al. |
| 2006/0089892 A1 | 4/2006 | Sullivan et al. |
| 2006/0116903 A1 | 6/2006 | Becerra |
| 2006/0129436 A1 | 6/2006 | Short |
| 2006/0143055 A1 * | 6/2006 | Loy et al. ........................ 705/4 |

(56) References Cited

U.S. PATENT DOCUMENTS

| | | |
|---|---|---|
| 2006/0143056 A1 | 6/2006 | Taylor et al. |
| 2006/0218011 A1 | 9/2006 | Walker et al. |
| 2006/0218023 A1 | 9/2006 | Conrad |
| 2006/0287893 A1 | 12/2006 | Weiss |
| 2007/0027726 A1 | 2/2007 | Warren et al. |
| 2007/0050215 A1 | 3/2007 | Kil |
| 2007/0050217 A1 | 3/2007 | Holden, Jr. |
| 2007/0055601 A1 | 3/2007 | Inderski et al. |
| 2007/0061237 A1* | 3/2007 | Merton et al. ............... 705/36 R |
| 2007/0088488 A1 | 4/2007 | Reeves |
| 2007/0094053 A1 | 4/2007 | Samuels |
| 2007/0094125 A1 | 4/2007 | Izyayev |
| 2007/0112669 A1 | 5/2007 | Snyder |
| 2007/0136093 A1 | 6/2007 | Rankin |
| 2007/0233512 A1 | 10/2007 | Gore |
| 2008/0005016 A1 | 1/2008 | Uhlmann |
| 2008/0010095 A1 | 1/2008 | Joyce |
| 2008/0033751 A1 | 2/2008 | Greene |
| 2008/0046382 A1 | 2/2008 | Metz |
| 2008/0059303 A1 | 3/2008 | Fordyce |
| 2008/0071600 A1 | 3/2008 | Johnson |
| 2008/0071661 A1 | 3/2008 | Jeudy et al. |
| 2008/0082369 A1 | 4/2008 | Carlson et al. |
| 2008/0082372 A1 | 4/2008 | Burch |
| 2008/0091471 A1 | 4/2008 | Michon |
| 2008/0147447 A1 | 6/2008 | Roche et al. |
| 2008/0154650 A1 | 6/2008 | Matisonn et al. |
| 2008/0172214 A1 | 7/2008 | Col |
| 2008/0189141 A1 | 8/2008 | Gore et al. |
| 2008/0189183 A1 | 8/2008 | Nicholson |
| 2008/0195486 A1 | 8/2008 | Sopinsky et al. |
| 2008/0197185 A1 | 8/2008 | Cronin et al. |
| 2008/0208769 A1 | 8/2008 | Beer et al. |
| 2008/0243558 A1 | 10/2008 | Gupte |
| 2008/0255979 A1 | 10/2008 | Slutzky et al. |
| 2008/0262877 A1 | 10/2008 | Hargroder |
| 2008/0262892 A1 | 10/2008 | Prager et al. |
| 2008/0312969 A1 | 12/2008 | Raines |
| 2009/0006140 A1 | 1/2009 | Wait |
| 2009/0024419 A1 | 1/2009 | McClellan et al. |
| 2009/0024478 A1 | 1/2009 | Dixon |
| 2009/0030736 A1 | 1/2009 | Tatro et al. |
| 2009/0030737 A1 | 1/2009 | Weiss |
| 2009/0037230 A1 | 2/2009 | Tracy |
| 2009/0076903 A1 | 3/2009 | Schwarzberg et al. |
| 2009/0105550 A1 | 4/2009 | Rothman |
| 2009/0150189 A1 | 6/2009 | Barron |
| 2009/0150192 A1 | 6/2009 | Gore et al. |
| 2009/0164256 A1 | 6/2009 | Fisher |
| 2009/0198525 A1 | 8/2009 | Gore et al. |
| 2009/0204441 A1 | 8/2009 | Read |
| 2009/0204446 A1 | 8/2009 | Simon |
| 2009/0204447 A1 | 8/2009 | Tucker |
| 2009/0210257 A1 | 8/2009 | Chalfant |
| 2009/0240532 A1 | 9/2009 | Gore et al. |
| 2009/0259497 A1 | 10/2009 | Gore et al. |
| 2009/0265183 A1 | 10/2009 | Pollard et al. |
| 2009/0299773 A1 | 12/2009 | Gore et al. |
| 2009/0299774 A1 | 12/2009 | Gore et al. |
| 2009/0299775 A1 | 12/2009 | Gore et al. |
| 2009/0299776 A1 | 12/2009 | Gore et al. |
| 2009/0299844 A1 | 12/2009 | Reilly et al. |
| 2009/0307015 A1 | 12/2009 | Gore et al. |
| 2010/0023354 A1 | 1/2010 | Gore et al. |
| 2010/0023384 A1 | 1/2010 | Pollard et al. |
| 2010/0049541 A1 | 2/2010 | Pollard et al. |
| 2010/0088112 A1 | 4/2010 | Krasny |
| 2010/0153296 A1 | 6/2010 | Volpert et al. |
| 2010/0228572 A1 | 9/2010 | Brooker |
| 2010/0332308 A1 | 12/2010 | Yap et al. |
| 2011/0021234 A1 | 1/2011 | Tibbitts |
| 2011/0029182 A1 | 2/2011 | Hyde et al. |
| 2011/0029358 A1 | 2/2011 | Hyde et al. |
| 2011/0040579 A1 | 2/2011 | Havens |
| 2011/0060635 A1 | 3/2011 | Pollard et al. |
| 2011/0106370 A1 | 5/2011 | Duddle et al. |
| 2011/0208671 A1 | 8/2011 | Edwards |
| 2012/0089442 A1 | 4/2012 | Olsson et al. |
| 2012/0130727 A1 | 5/2012 | Ahmed |
| 2012/0245992 A1 | 9/2012 | Pender et al. |
| 2012/0330687 A1 | 12/2012 | Hilario et al. |
| 2013/0013344 A1 | 1/2013 | Ernstberger et al. |
| 2013/0085819 A1 | 4/2013 | Gore et al. |
| 2013/0282472 A1 | 10/2013 | Penilla et al. |
| 2013/0311250 A1 | 11/2013 | Hickethier et al. |
| 2013/0317860 A1 | 11/2013 | Schumann, Jr. |

FOREIGN PATENT DOCUMENTS

| | | |
|---|---|---|
| AU | 2007/257457 | 1/2009 |
| AU | 2007/257458 | 1/2009 |
| AU | 2007/257546 | 1/2009 |
| AU | 2007/298514 | 2/2009 |
| AU | 2007/301521 | 5/2009 |
| CN | 2005/880047059 | 7/2007 |
| EP | 1050821 | 11/2000 |
| IL | 195735 | 12/2008 |
| IL | 195737 | 12/2008 |
| IL | 195738 | 12/2008 |
| WO | 02/47074 | 6/2002 |
| WO | 03/007230 | 1/2003 |
| WO | 2007/141695 | 12/2007 |
| WO | 2007/141696 | 12/2007 |
| WO | 2007/141968 | 12/2007 |
| WO | 2008/035280 | 3/2008 |
| WO | 2012085691 | 6/2012 |
| ZA | 98/02005 | 3/1998 |
| ZA | 98/11943 | 12/1998 |
| ZA | 2000/04682 | 9/2000 |
| ZA | 2004/02587 | 4/2004 |
| ZA | 2004/02891 | 4/2004 |
| ZA | 2004/05935 | 7/2004 |
| ZA | 2004/06294 | 8/2004 |
| ZA | 2006/01934 | 3/2006 |
| ZA | 2006/04673 | 6/2006 |
| ZA | 2006/04674 | 6/2006 |
| ZA | 2006/04687 | 6/2006 |
| ZA | 2006/04688 | 6/2006 |
| ZA | 2006/07789 | 9/2006 |
| ZA | 2006/07992 | 9/2006 |
| ZA | 2008-03529 | 4/2008 |
| ZA | 2008/04807 | 6/2008 |
| ZA | 2008/04808 | 6/2008 |
| ZA | 2008/04809 | 6/2008 |
| ZA | 2008/04810 | 6/2008 |
| ZA | 2008/04811 | 6/2008 |
| ZA | 2009/01740 | 3/2009 |

OTHER PUBLICATIONS

U.S. Appl. No. 09/876,311, Final Rejection Oct. 23, 2006.
U.S. Appl. No. 09/876,311, Final Rejection Dec. 16, 2009.
U.S. Appl. No. 09/876,311, Non-Final Rejection Jan. 17, 2006.
U.S. Appl. No. 09/876,311, Non-Final Rejection Nov. 30, 2007.
U.S. Appl. No. 09/876,311, Non-Final Rejection Jul. 9, 2010.
U.S. Appl. No. 09/876,311, Requirement for Restriction May 18, 2007.
U.S. Appl. No. 09/876,311, Requirement for Restriction Jan. 2, 2009.
U.S. Appl. No. 09/876,311, Requirement for Restriction Jan. 16, 2009.
U.S. Appl. No. 09/876,311, Requirement for Restriction Aug. 10, 2009.
U.S. Appl. No. 09/876,311, Response to Office Action Jul. 19, 2006.
U.S. Appl. No. 09/876,311, Response to Office Action Feb. 23, 2007.
U.S. Appl. No. 09/876,311, Response to Office Action Jul. 17, 2007.
U.S. Appl. No. 09/876,311, Response to Office Action May 29, 2008.
U.S. Appl. No. 09/876,311, Response to Office Action Oct. 15, 2008.
U.S. Appl. No. 09/876,311, Response to Office Action Feb. 5, 2009.
U.S. Appl. No. 09/876,311, Response to Office Action May 28, 2009.
U.S. Appl. No. 09/876,311, Response to Office Action Sep. 10, 2009.
U.S. Appl. No. 09/876,311, Response to Office Action May 17, 2010.
U.S. Appl. No. 09/982,274, filed Oct. 17, 2001.

(56) References Cited

OTHER PUBLICATIONS

U.S. Appl. No. 09/982,274, Final Rejection Nov. 27, 2006.
U.S. Appl. No. 09/982,274, Final Rejection May 6, 2008.
U.S. Appl. No. 09/982,274, Final Rejection Jun. 9, 2009.
U.S. Appl. No. 09/982,274, Non-Final Rejection Mar. 3, 2006.
U.S. Appl. No. 09/982,274, Non-Final Rejection Aug. 9, 2007.
U.S. Appl. No. 09/982,274, Non-Final Rejection Oct. 17, 2008.
U.S. Appl. No. 09/982,274, Response to Office Action Sep. 6, 2006.
U.S. Appl. No. 09/982,274, Response to Office Action May 29, 2007.
U.S. Appl. No. 09/982,274, Response to Office Action Jan. 22, 2008.
U.S. Appl. No. 09/982,274, Response to Office Action Aug. 6, 2008.
U.S. Appl. No. 09/982,274, Response to Office Action Feb. 17, 2009.
U.S. Appl. No. 09/982,274, Notice of Appeal filed Sep. 9, 2009.
U.S. Appl. No. 09/982,274, Appeal Brief Filed Nov. 9, 2009.
U.S. Appl. No. 09/982,274, Reply Brief filed Apr. 2, 2010.
U.S. Appl. No. 12/112,165, filed Apr. 30, 2001.
U.S. Appl. No. 10/251,120, filed Sep. 20, 2002.
U.S. Appl. No. 10/251,120, Final Rejection Dec. 31, 2007.
U.S. Appl. No. 10/251,120, Final Rejection Jun. 25, 2009.
U.S. Appl. No. 10/251,120, Non-Final Rejection Mar. 29, 2007.
U.S. Appl. No. 10/251,120, Non-Final Rejection Jan. 5, 2009.
U.S. Appl. No. 10/251,120, Examiner Summary Oct. 21, 2009.
U.S. Appl. No. 10/251,120, Examiner Summary Jul. 6, 2010.
U.S. Appl. No. 10/251,120, Response to Office Action Sep. 28, 2007.
U.S. Appl. No. 10/251,120, Response to Office Action Oct. 7, 2008.
U.S. Appl. No. 10/251,120, Response to Office Action Apr. 6, 2009.
U.S. Appl. No. 10/251,120, Appeal Brief Filed Mar. 24, 2010.
U.S. Appl. No. 12/122,549, filed May 16, 2008.
U.S. Appl. No. 11/198,206, filed Aug. 5, 2005.
U.S. Appl. No. 11/198,206, Final Rejection Jan. 23, 2009.
U.S. Appl. No. 11/198,206, Non-Final Rejection Jun. 30, 2008.
U.S. Appl. No. 11/198,206, Response to Office Action Oct. 30, 2008.
U.S. Appl. No. 12/333,465, filed Dec. 12, 2008.
U.S. Appl. No. 12/262,266, filed Oct. 31, 2008.
U.S. Appl. No. 12/303,388, filed Dec. 4, 2008.
U.S. Appl. No. 12/303,391, filed Dec. 4, 2008.
U.S. Appl. No. 12/303,395, filed 12/4/200.
U.S. Appl. No. 12/303,399, filed Dec. 4, 2008.
U.S. Appl. No. 12/441,447, filed Mar. 16, 2009.
U.S. Appl. No. 10/344,176, filed Aug. 15, 2003.
U.S. Appl. No. 10/344,176, Final Rejection Oct. 30, 2008.
U.S. Appl. No. 10/344,176, Final Rejection Mar. 2, 2010.
U.S. Appl. No. 10/344,176, Non-Final Rejection Dec. 19, 2007.
U.S. Appl. No. 10/344,176, Non-Final Rejection Jun. 8, 2009.
U.S. Appl. No. 10/344,176, Response to Office Action May 19, 2008.
U.S. Appl. No. 10/344,176, Response to Office Action Mar. 2, 2009.
U.S. Appl. No. 10/344,176, Response to Office Action Nov. 9, 2009.
U.S. Appl. No. 11/189,647, filed Jul. 26, 2005.
U.S. Appl. No. 11/189,647, Final Rejection May 11, 2010.
U.S. Appl. No. 11/189,647, Non-Final Rejection Aug. 14, 2009.
U.S. Appl. No. 11/189,647, Response to Office Action Feb. 15, 2010.
U.S. Appl. No. 10/819,256, filed Apr. 6, 2004.
U.S. Appl. No. 10/819,256, Final Rejection Jan. 6, 2009.
U.S. Appl. No. 10/819,256, Non-Final Rejection Mar. 18, 2008.
U.S. Appl. No. 10/819,256, Response to Office Action Sep. 18, 2008.
U.S. Appl. No. 11/097,947, filed Apr. 1, 2006.
U.S. Appl. No. 11/097,947, Non-Final Rejection Nov. 10, 2009.
U.S. Appl. No. 11/097,947, Final Rejection Jun. 7, 2010.
U.S. Appl. No. 11/097,947, Response to Office Action Mar. 10, 2010.
U.S. Appl. No. 10/818,574, filed Apr. 6, 2004.
U.S. Appl. No. 10/818,574, Non-Final Rejection Feb. 4, 2009.
U.S. Appl. No. 10/818,574, Response to Office Action May 4, 2009.
U.S. Appl. No. 11/074,453, filed Mar. 8, 2005.
U.S. Appl. No. 11/074,453, Non-Final Rejection Mar. 4, 2009.
U.S. Appl. No. 11/074,453, Requirement for Election Mar. 31, 2010.
U.S. Appl. No. 11/074,453, Notice of Non-compliant response Nov. 9, 2009.
U.S. Appl. No. 11/074,453, Response to Office Action Apr. 29, 2010.
U.S. Appl. No. 11/074,453, Response to Office Action Nov. 23, 2009.
U.S. Appl. No. 11/074,453, Response to Office Action Jul. 6, 2009.
U.S. Appl. No. 11/794,830, filed Jan. 22, 2008.
U.S. Appl. No. 11/794,830, Final Rejection Dec. 7, 2009.
U.S. Appl. No. 11/794,830, Non-Final Rejection May 27, 2009.
U.S. Appl. No. 11/794,830, Response to Office Action Sep. 28, 2009.
U.S. Appl. No. 11/794,830, Response to Office Action Apr. 7, 2010.
U.S. Appl. No. 11/903,607, filed Sep. 24, 2007.
U.S. Appl. No. 11/903,607, Final Rejection Jan. 28, 2010.
U.S. Appl. No. 11/903,607, Non-Final Rejection May 13, 2009.
U.S. Appl. No. 11/903,607, Response to Office Action Aug. 12, 2009.
U.S. Appl. No. 11/903,607, Response to Office Action Apr. 28, 2010.
U.S. Appl. No. 12/442,549, filed Mar. 24, 2009.
U.S. Appl. No. 12/477,179, filed Jun. 3, 2009.
U.S. Appl. No. 12/477,208, filed Jun. 3, 2009.
U.S. Appl. No. 12/477,213, filed Jun. 3, 2009.
U.S. Appl. No. 12/477,225, filed Jun. 3, 2009.
U.S. Appl. No. 12/477,189, filed Jun. 3, 2009.
U.S. Appl. No. 12/721,619, filed Mar. 11, 2010.
U.S. Appl. No. 11/715,181, filed Mar. 7, 2007.
U.S. Appl. No. 11/715,181, Non-Final Rejection Nov. 3, 2009.
U.S. Appl. No. 11/715,181, Non-Final Rejection May 12, 2010.
U.S. Appl. No. 11/715,181, Response to Office Action Feb. 3, 2010.
U.S. Appl. No. 12/303,395, Non-Final Rejection Jan. 24, 2011.
U.S. Appl. No. 12/912,009 filed Oct. 26, 2010.
U.S. Appl. No. 12/912,040 filed Oct. 26, 2010.
U.S. Appl. No. 12/112,165, Final Rejection Feb. 10, 2011.
U.S. Appl. No. 11/715,181, Response to Office Action Mar. 11, 2011.
U.S. Appl. No. 12/303,388, Non-Final Office Action mailed Mar. 11, 2011.
U.S. Appl. No. 12/477,225, Non-final Office Action Mar. 25, 2011.
U.S. Appl. No. 12/122,549, Non-final Office Action Mar. 30, 2011.
U.S. Appl. No. 12/33,465, Non-final Office Action Mar. 30, 2011.
U.S. Appl. No. 11/189,647, Response to Office Action Apr. 18, 2011.
U.S. Appl. No. 12/303,395, Non-Final Rejection Apr. 29, 2011.
U.S. Appl. No. 12/303,391, Final Office Action May 11, 2011.
U.S. Appl. No. 10/344,176, Office Action May 16, 2011.
U.S. Appl. No. 11/074,453, Requirement for Election May 23, 2011.
U.S. Appl. No. 12/303,388 Response Jun. 8, 2011.
U.S. Appl. No. 12/303,395 Final Office Action Jun. 13, 2011.
U.S. Appl. No. 12/333,465, Response filed Jun. 30, 2011.
U.S. Appl. No. 12/122,549, Response filed Jul. 21, 2011.
U.S. Appl. No. 12/303,388 Final Office Action Jul. 5, 2011.
U.S. Appl. No. 11/189,647, Final Office Action Jun. 22, 2011.
U.S. Appl. No. 12/477,225, Non Final Office Action Jul. 8, 2011.
U.S. Appl. No. 12/441,447, Non Final Office Action Aug. 1, 2011.
U.S. Appl. No. 12/477,179, Non final office action Jul. 22, 2011.
U.S. Appl. No. 12/477,208, Non final office action Jul. 22, 2011.
U.S. Appl. No. 12/477,189 non final Office Action Aug. 5, 2011.
U.S. Appl. No. 12/303,391 RCE response Aug. 11, 2011.
U.S. Appl. No. 11/189,647, Response Aug. 12, 2011.
U.S. Appl. No. 12/303,388 Response Sep. 2, 2011.
U.S. Appl. No. 12/477,213 Non Final Office Action Aug. 9, 2011.
U.S. Appl. No. 12/442,549 non Final Office Action Sep. 19, 2011.
U.S. Appl. No. 12/477,225 Final Office Action Sep. 28, 2011.
U.S. Appl. No. 12/33465 Final Office Action Oct. 4, 2011.
U.S. Appl. No. 12/477,179, Response filed Oct. 24, 2011.
U.S. Appl. No. 12/122,549, Final Office Action Oct. 6, 2011.
U.S. Appl. No. 11/074,453, Office Action Oct. 11, 2011.
U.S. Appl. No. 12/441,447, Response filed Nov. 1, 2011.
U.S. Appl. No. 12/477,189, Response filed Nov. 4, 2011.
U.S. Appl. No. 12/721,619, Preliminary Amendment filed Nov. 3, 2011.
Rintelman, Mary Jane, "Choice and cost-savings", Credit Union Management, vol. 19, No. 7, pp. 48, 50. Jul. 1996.
Woodard, Kathy, "stay healthy for real fun—and profit", Business First Columbus, vol. 12, No. 19, S.1, p. 13. Jan. 1996.
Spencer, Peter L., "New plan cuts health car costs in half (advantage of health care plan with high deductible)", Consumers' Research Magazine, vol. 76, No. 10, pp. 16. Oct. 1993.
Communuity Hearth Health Programs: Components, Ratio: John P. Elder, Thomas L. Schmid, Phyillis Dower and Sonja Hedlund; Journal of Public Health Policy; Palgrave Macmillian; 1993 winter; pp. 463-479.

(56) References Cited

OTHER PUBLICATIONS

Ferling ("New plans, New policies," Ferling, Rhona. Best's Review; Apr. 1993 p. 78).
"Plan Highlights for El Paso ISD" Salary Protection Insurance Plan, web-site—http://w3.unumprovident.com/enroll/elpasoisd/your_plan.htm, Mar. 3, 2008.
Consumer-Driven Health Plans Catch on as Myths Fall by Wayside (Sep. 4). PR Newswire, 1.
Art Technology Group; Discovery Holdings to exploit online interest in healthcare and life assurance with ATG commerce functionality; Revenue potential significant as 70% of Discovery members access the internet. (Oct. 28). M2 Presswire, 1.
"Absenteeism Control"; Cole, Thomas C. et al; Management Decision; London: 1992. vol. 20, Iss. 2; p. 12 (AC).
Saleem, Haneefa: "Health Spending Accounts"; Dec. 19, 2003; posted online at http://www.bls.gov/opub/cwc/print/cm20031022ar01p1.htm.
Insure.com; "The lowdown on life insurance medical exams"; Jun. 28, 2006; Imaged from the Internet Archive Waybackmachine on May 10, 2006 at http://web.archive.org/web/20060628231712/http://articles.moneycentral.msn. com/Insurance/Insureyourlife/thelowdownonlifeinsurancwemedicalexams.aspx.
Definition of insurance, New Penguin Business Dictionary, Retreieved Oct. 26, 2008 from http://www.credoreference.com/entry/6892512/.
R.C. Olmstead, "Our Products" May 2008.
Andrew Cohen; Putting Wellness to work; date Mar. 1, 1997; Athletic Business, pp. 1-7.
www.netpulse.net; Netpulsue Makes Working Out More than a Calorie-Burning Session; date Mar. 21, 1998, pp. 1-2.
www.netpulse.net; 24 Hour Fitness Partners with Netpulse; date Mar. 9, 1998; p. 1.
Trends in Medical Benefit Plan Design to Control Claim Costs; Record of Society of Actuaries; date 1982; vol. 8, No. 2, pp. 515-531.
David Richards, Return of Premium Disability Insurance; The Black Hole, dated Jul. 15, 2010, p. 1-4.
"SIDELINES" WWD, p. 10—STIC Scientific and Technical Information Center, Feb. 3, 2000.
019 Co-pending U.S. Appl. No. 11/074,453, Final Office Action mailed Jul. 19, 2010.
015 Co-pending U.S. Appl. No. 11/189,647, Request for Continued Examination filed Jul. 19, 2010.
015 Co-pending U.S. Appl. No. 11/715,181, Response filed Aug. 12, 2010.
021 Co-pending U.S. Appl. No. 12/112,165, Non-final Office Action mailed Sep. 2, 2010.
003-1 Co-pending U.S. Appl. No. 10/251,120, Request for Continued Examination filed Oct. 6, 2010.
004 Co-pending U.S. Appl. No. 12/303,391, Non final Office Action mailed Nov. 24, 2010.
019 Co-pending U.S. Appl. No. 11/074,453, Response to final office action Dec. 20, 2010.
002 Co-pending U.S. Appl. No. 09/876,311, Non-final Office Action mailed Jul. 9, 2010.
u1—Discovery Life "The Discovery life Portfolio", 62 pgs—2008.
u2- AFLAC "Personal Disability Income Protector", 6 pgs—Jul. 2003.
v1—Discovery Life—"Why Discovery Life"—4 pgs—May 29, 2008.
v2 GE Group Life Assurance Company—Group Short Term Disability Insurance—18 pgs, Oct. 29, 2004.
w1 Wenfin Financial Services, "Discovery Life Plan" www.bmlink.co.za/WenFininsurance—Website download, 58 pgs, Aug. 5, 2011.
w2 EconEdLink—"How Long is Your life?" —Tutorial from EconEdLink.com web-site, 4 pgs, posted Sep. 13, 2004.
x1 AFLAC—"Personal Cancer Indemnity Plan" Level 3, 11 pgs, Jun. 2005.
x2 Gendell Murray, "Retirement age Declines again in 1990s", Monthly Labor Review, 10 pgs, Oct. 2001.
u1—Discovery Life "Benefit version Reference Guide" Oct. 2008.
v1-Discovery Life—"Discovery life Group Risk Life Plan".
x1 AFLAC—Discovery Life "Application for Discovery Card Protector" Nov. 2007.
u2- Discovery Life "The Disovery Life Portfolio" Nov. 20, 2008.
w2 Dsicovery Life "Discovery Individual Lie Plan Guide" Aug. 4, 2009 EconEdLink—How Long is Your life?—Tutorial from EconEdLink.com web-site, posted Sep. 13, 2004.
x2 Discovery Life "The Discovery Life Portfolio" Jun. 2008.
u3 Discovery Invest Group Retirement {Plan Financial Solutions for employees: Oct. 17, 2009.
International Search Report for PCT/IB05/003842 filed Dec. 21, 2005 (WO2006/072822).
Written Opinion for PCT/IB05/003842 filed Dec. 21, 2005 (WO2006/072822).
International Preliminary Report on Patentability for PCT/IB05/003842 filed Dec. 21, 2005 (WO2006/072822).
International Search Report for PCT/IB07/051945 filed May 23, 2007 (WO2007/141695).
Written Opinion for PCT/IB07/051945 filed May 23, 2007 (WO2007/141695).
International Preliminary Report on Patentability for PCT/IB07/051945 filed May 23, 2007 (WO2007/141695).
International Search Report for PCT/IB07/051946 filed May 23, 2007 (WO2007/141696).
Written Opinion for PCT/IB07/051946 filed May 23, 2007 (WO2007/141696).
International Preliminary Report on Patentability for PCT/IB07/051946 filed May 23, 2007 (WO2007/141696).
International Search Report for PCT/IB07/051947 filed May 23, 2007 (WO2007/141697).
Written Opinion for PCT/IB07/051947 filed May 23, 2007 (WO2007/141697).
International Preliminary Report on Patentability for PCT/IB07/051947 filed May 23, 2007 (WO2007/141697).
International Search Report published Apr. 23, 2009 for PCT/IB07/051948 filed May 23, 2007 (WO2007/141698).
Written Opinion published Mar. 13, 2009 PCT/IB07/051948 filed May 23, 2007 (WO2007/141698).
International Preliminary Report on Patentability published Mar. 17, 2009 for PCT/IB07/051948 filed May 23, 2007 (WO2007/141698).
International Search Report for PCT/IB07/053906 filed Sep. 26, 2007 (WO2008/038232).
Written Opinion for PCT/IB07/053906 filed Sep. 26, 2007 (WO2008/038232).
International Preliminary Report on Patentability for PCT/IB07/053906 filed Sep. 26, 2007 (WO2008/038232).
International Search Report for PCT/IB01/01406 filed Aug. 8, 2001 (WO2002/013438).
International Preliminary Report on Patentability for PCT/IB01/01406 filed Aug. 8, 2001 (WO2002/013438).
International Search Report PCT/IB11/52875 dated Nov. 23, 2011.
Connell Medical Tourism: Sea, sun, sand and surgery, Dec. 2006, Tourism Management, vol. 27, issue 6, pp. 1093-1110.
U.S. Appl. No. 12/912,009 Response filed Aug. 8, 2013.
U.S. Appl. No. 13/318,620,Final Office Action Sep. 3, 2013.
U.S. Appl. No. 13/782,203, Non-final Office Action Sep. 5, 2013.
Barron's Dictionary of Fiance, 3rd Edition, 1995, pp. 503, referenced in office action mailed Jan. 31, 2013, U.S. Appl. No. 13/318,620.
AFBIC Insurance Products, Jan. 6, 2009, Captured by internet Archive WayBack Machine . Http;//web.archive.org/web/20090106144129/http://www.afbic.com/products/auto.aspx.
International Search Report for PCT/IB2007/053760 filed Sep. 18, 2007 (WO2008/035280).
Written Opinion for PCT/IB2007/053760 filed Sep. 18, 2007 (WO2008/035280).
2006-Insurance Benefits/Coverage outline.
International Preliminary Report on Patentability for PCT/IB2007/053760 filed Sep. 18, 2007 (WO2008/035280).
U.S. Appl. No. 12/477,225, Final Office Action Feb. 4, 2013.
U.S. Appl. No. 13/318,620, Non-final Office Action Jan. 31, 2013.
U.S. Appl. No. 13/386,431 Offfice Action Mar. 28, 2013.
U.S. Appl. No. 13/365,430 office action Oct. 1, 2012.
U.S. Appl. No. 13/365,430 response filed Feb. 19, 2013.

(56) References Cited

OTHER PUBLICATIONS

U.S. Appl. No. 13/486,002 Office Action Jan. 31, 2013.
U.S. Appl. No. 13/782,203, filed Mar. 1, 2013.
U.S. Appl. No. 13/996,058, filed Jun. 20, 2013.
U.S. Appl. No. 14/138,573, filed Dec. 20, 2013.
Flexible Spending Account, from Wikipedia encyclopedia, pp. 7, retrieved Sep. 28, 2012.
Article, Health Care Spending Accounts, AHIP America's Health Insurance Plans, pp. 12, retrieved Sep. 28, 2012.
Health Reimbursement Account, from Wikipedia encyclopedia, pp. 4, retrieved Sep. 28, 2012.
Health Savings Account, from Wikipedia encyclopedia, pp. 10, retrieved Sep. 28, 2012.
Saleem- Article, Health Spending Accounts, U.S. Bureau of Labor Statistics, pp. 5, retrieved Sep. 28, 2012.
Long-Term Insurance Act, No. 52, Jan. 1, 1998, Administration of Act, 55 pgs.
Government Gazette, Republic of South Africa, Insurance laws Amendment Act 2008, vol. 521, Cape Town, Nov. 5, 2008, No. 31578, 36 pgs.
Regulation Gazette No. 6652, Government Notice, Medical Schemes Act, vol. 412, Oct. 20, 1999, 67 pgs.
Government Gazette, Republic of South Africa, Staatskoerant, Cape Town, vol. 399, Sep. 23, 1998, No. 19277, 49 pgs.
U.S. Appl. No. 13/325,719, filed Nov. 3, 2011.
U.S. Appl. No. 13/386,431, filed Jan. 23, 2012.
U.S. Appl. No. 13/365,430, filed Feb. 3, 2012.
U.S. Appl. No. 13/365,527, filed Feb. 3, 2012.
U.S. Appl. No. 13/365,566, filed Feb. 3, 2012.
U.S. Appl. No. 13/472,571, filed May 16, 2012.
U.S. Appl. No. 13/486,002, filed Jun. 1, 2012.
U.S. Appl. No. 13/638,608, filed Sep. 30, 2012.
U.S. Appl. No. 13/648,309, filed Oct. 10, 2012.
U.S. Appl. No. 13/641,143, filed Oct. 15, 2012.
U.S. Appl. No. 13/641,145, filed Oct. 15, 2012.
U.S. Appl. No. 13/641,155, filed Oct. 15, 2012.
U -ATG Customer Success Story: Discovery Heathly 2006 ART Tech Group, Inc.
V Discovery Vitality; Discovery Vitality 2009 Sep. 12, 2008.
W Discovery Invest, Group Retirement Plan Finanical solutions for employees Jan. 17, 2009.
W1 WenfinWebPages for Discovery Life Nov. 13, 2006.
X Baker et al. Pay for Performance Incentive Programs in Healthcare; Market Dynammics and Business Process-Research Report 2003.
U PruHealth, Individual Policy Document Jul. 2008.
V Discovery Vitality, Lesson Plans Grade 4 nad 5 Apr. 2, 2008.
W HLC Financial Services, Discovery News Feb. 2009.
U The Discovery Life, "Technical guide for financial advisers" Nov. 2008.
U.S. Appl. No. 12/477,213 Supplemental Response filed Jun. 6, 2012.
U.S. Appl. No. 12/477,213 Response filed Feb. 8, 2012.
U.S. Appl. No. 12/442,549 Final Office Action Feb. 6, 2012.
U.S. Appl. No. 11/903,607, Response filed Feb. 29, 2012.
U.S. Appl. No. 11/903,607, Office Action Nov. 30, 2011.
U.S. Appl. No. 11/794,830, Supplemental response May 18, 2012.
U.S. Appl. No. 11/794,830, Non-Final Rejection Dec. 19, 2011.
U.S. Appl. No. 11/074,453, Response filed Jan. 11, 2012.
U.S. Appl. No. 13/365,566 Office action Nov. 5, 2012.
U.S. Appl. No. 12/912,040, Supplemental response filed Jun. 14, 2012.
U.S. Appl. No. 12/912,040, Office Action Oct. 20, 2011.
U.S. Appl. No. 12/912,009 Response filed Aug. 31, 2012.
U.S. Appl. No. 12/912,009 Non-final Office Action Dec. 19, 2011.
U.S. Appl. No. 12/477,189 Response filed Mar. 5, 2012.
U.S. Appl. No. 12/477,189 Final Office Action Dec. 5, 2011.
U.S. Appl. No. 12/477,213 Supplemental Response filed Jul. 9, 2012.
U.S. Appl. No. 12/112,165, Non Final Office Action mailed May 17, 2012.
U.S. Appl. No. 12/112,165, Final Office Action Nov. 2, 2012.
U.S. Appl. No. 12/122,549, RCE response Jan. 6, 2012.
U.S. Appl. No. 12/122,549, Office Action Feb. 15, 2012.
U.S. Appl. No. 12/303,395 Response filed May 11, 2012.
U.S. Appl. No. 12/441,447, Final Office Action Jan. 10, 2012.
What is a no Claim Discount? Posted by Brendan "No Nonsense Insurance Blog" Jun. 25, 2009 (Archived under "A guide to insurance") http://blog.nononsense.ie/2009/06/26what-is-a-no-claims-discount, Jan. 12, 2014.
"What is no claims discount?" Posted by "Brendan" on "No Nonsense Insurance Blog" on Jun. 26, 2009 (archived under "A guide to insurance"), http://blog.nononsense.ie/2009/0626/what-is-a-no-claims-discount, accessed Jan. 12, 2014.
"Why do companies offer different auto insurance discounts and what discounts does Progressive offer?" posted by "Allison Ruuska" on @Progressive Blog-Auto Insurace Discount on Feb. 9, 2009; http://www.progressive.com/understanding_insurance/entries/2009/9/1/auto_insurance_disc/, accessed Jan. 13, 2014.
U.S. Appl. No. 13/641,155, Non-final Office Action Mar. 28, 2014.
U.S. Appl. No. 13/641,143, Non-final Office Action Mar. 27, 2014.
U.S. Appl. No. 12/333,465 Non-final Office Action Apr. 4, 2014.
U.S. Appl. No. 13/782,203 final Office Action Apr. 16, 2014.
U.S. Appl. No. 13/486,002 final Office Action 04-0-2014.

* cited by examiner

SYSTEM AND METHOD OF MANAGING AN INSURANCE SCHEME

BACKGROUND OF THE INVENTION

The present application relates to a system and method of managing an insurance scheme.

The present invention may be implemented by a traditional life insurance plan operator for its members or may be implemented by another party.

Conventionally, insurance policies such as life insurance policies operate on the basis that an insured person, sometimes referred to as an insured life, pays a premium to the life insurer, and the life insurer pays a predetermined sum, referred to as the sum assured, to the insured life or his/her beneficiary on the occurrence of an insured event. Typical insured events are the insured life suffering disability, contracting a dread disease or dying.

However, it will be appreciated that the processing and finalising of the payment can take some time, in some cases up to several months or even years. In this instance the insured person may have short term financial difficulties if they are dependent on this payment.

A system and method of addressing this is therefore required.

SUMMARY OF THE INVENTION

According to one example embodiment, a method of managing an insurance scheme, the method including:
  defining a plurality of categories of living expenses;
  defining a plurality of life changing events;
  on the occurrence of a life changing event for an insured person of the scheme, at least partially subsidising expenses in the category of living expenses for the insured person or a nominated beneficiary of the insured person.

The plurality of living expenses may include at least one of the group consisting of food, clothing, transport, utilities, communication and accommodation expenses.

The subsidy may be a predetermined percentage of the expenses incurred in the defined category of living expenses or is a defined amount of the expenses incurred in the defined category of living expenses.

In one example, the plurality of life changing events includes disability, contracting a dread disease or dying.

The at least partial subsidising of expenses may occur for a predetermined period such as 12 months.

The at least partial subsidising may be effected by reimbursing the insured person or their nominated beneficiary for expenses incurred in the defined category of living expenses.

The at least partial subsidising may be effected by paying third parties for expenses incurred in the defined category of living expenses on behalf of the insured person or their nominated beneficiary.

In one example the at least partial subsidising is effected by calculating the spending of the insured person in the various categories of living expenses for a time period prior to the life changing event and then paying this amount or a percentage of this amount to the insured person or their nominated beneficiary.

In addition, the at least partial subsidy may have a maximum amount applicable calculated by determining the spending of the insured person in the various categories of living expenses for a time period prior to the life changing event such as six months.

The method may be linked to a credit card of the insured life whereby the at least partial subsidising is implemented by paying at least a portion of the amount spent on the credit card on behalf of the insured person or the nominated beneficiary.

The amount of spending in any of the categories of living expenses may be determined by checking historical spending on the credit card.

The present invention further includes an electronic system for managing insurance scheme, the system including:
  a living expenses module to define a plurality of categories of living expenses;
  a life changing events module to define a plurality of life changing events; and
  a calculation module to, on the occurrence of a life changing event for an insured person of the scheme, calculate an at least partial subsidy of expenses in the category of living expenses for the insured person or a nominated beneficiary of the insured person.

The calculation module may calculate the plurality of living expenses that includes at least one of the group consisting of food, clothing, transport, utilities, communication and accommodation expenses.

The calculation module may calculate the at least partial subsidy as a predetermined percentage of the expenses incurred in the defined category of living expenses or is a defined amount of the expenses incurred in the defined category of living expenses.

The plurality of life changing events may be defined by the life changing events module includes disability, contracting a dread disease or dying.

The calculation module may calculate the at least partial subsidising of expenses for a predetermined period such as 12 months.

The system may further including a payment module to effect a payment of the at least partial subsidy.

The payment module may effect the payment by reimbursing the insured person or their nominated beneficiary for expenses incurred in the defined category of living expenses.

The at least partial subsidising may be effected by the payment module paying third parties for expenses incurred in the defined category of living expenses on behalf of the insured person or their nominated beneficiary.

The at least partial subsidising is effected by the calculation module calculating the spending of the insured person in the various categories of living expenses for a time period prior to the life changing event and then the payment module paying this amount or a percentage of this amount to the insured person or their nominated beneficiary.

The at least partial subsidy may have a maximum amount applicable calculated by the calculation module determining the spending of the insured person in the various categories of living expenses for a time period prior to the life changing event such as six months.

The method may be linked to a credit card of the insured life whereby the at least partial subsidy is implemented by the payment module paying at least a portion of the amount spent on the credit card on behalf of the insured person or the nominated beneficiary.

In one example, the amount of spending in any of the categories of living expenses is determined by the calculation module by checking historical spending on the credit card.

A machine-readable medium embodying instructions which, when executed by a machine, cause the machine to perform a method including:

defining a plurality of categories of living expenses;
    defining a plurality of life changing events;
    on the occurrence of a life changing event for an insured person of the scheme, at least partially subsidising expenses in the category of living expenses for the insured person or a nominated beneficiary of the insured person.

DESCRIPTION OF EMBODIMENTS

The systems and methodology described herein relate to a system and method of managing an insurance scheme such as a life insurance scheme.

Conventional life insurance schemes operate on the basis that an insured person, referred to as the insured life, pays premiums on a regular basis to the life insurer, specifying a sum assured which is an amount to be paid out on the occurrence of an insured event. For example, on the death of the insured life, a predetermined death benefit is paid to the nominated beneficiaries of the insured life. If the insured life is disabled or suffers a dread disease, a different, lesser amount is paid out.

The method and system will be described with reference to these kind of schemes but it will be appreciated that the method and system could equally be applied to other types of insurance schemes.

It will also be appreciated that the system and methodology may be implemented by any relevant person or organisation. For example, the system and methodology may be operated by the organisation which operates the life insurance scheme or may be implemented by another associated organisation. In one example the system and methodology may be implemented by a financial organisation which issues credit cards to its members.

For purposes of illustration, the system and methodology will be described herein as being operated by the managers of a life insurance scheme.

Figure 1:
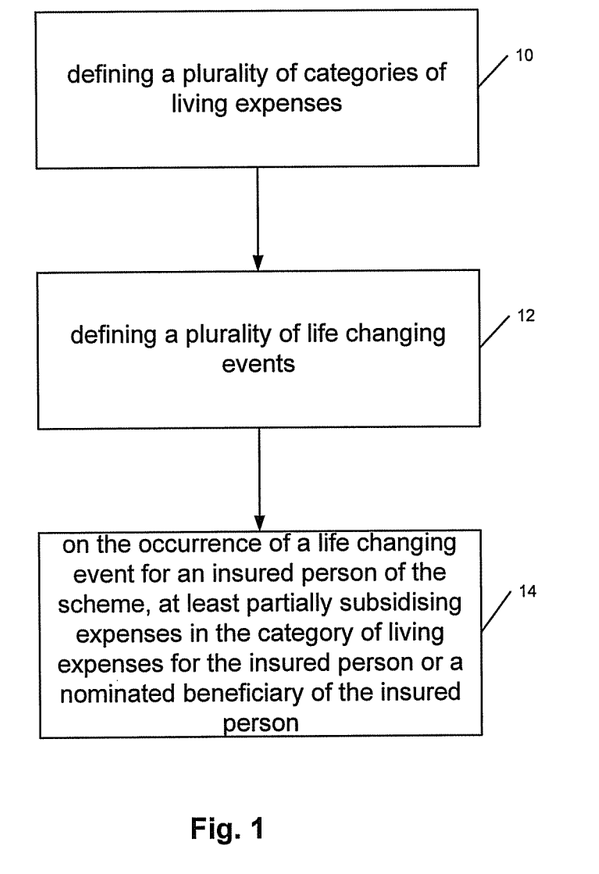
FIG. 1 is a flow chart illustrating the methodology of an example embodiment.

Referring to FIG. 1, a plurality of categories of living expenses are define (block 10). In the illustrated example, the categories of living expenses include at least one of the group consisting of food, clothing, transport, utilities, communication and accommodation expenses. It will be appreciated that the method may include defining all of these as categories of living expenses.

In addition to this, a plurality of life changing events are defined (block 12). The plurality of life changing events in the example includes disability, contracting a dread disease or dying as these are typical of the kind of events which are insured by life insurance schemes. However, it will be appreciated that in other contexts these life changing events may be other events such as the birth of a child or changing jobs to name but a few examples.

In any event, the occurrence of a life changing event for an insured person of the scheme results in an at least partial subsidising of expenses in the category of living expenses for the insured person or a nominated beneficiary of the insured person (block 14). Typically the subsidy is arranged for the insured person but where the insured person has died or is otherwise incapacitated the subsidy will be activated for a beneficiary that the insured person has nominated prior to the event.

The subsidy may be a predetermined percentage of the expenses which will be incurred in the defined category of living expenses or may be all of the expenses which will be incurred in the defined category of living expenses and may be available for a predetermined period such as 12 months, for example. In one embodiment this period will typically not be too long a period where this is intended to be a bridging type of assistance. In other embodiments this may be intended as long term assistance and could then be extended for a number of years, such as until the nominated beneficiary passes away or reaches a certain age.

The subsidy could also take any one of a number of different forms.

In one example, the subsidy is effected by reimbursing the insured person or their nominated beneficiary for expenses incurred in the defined category of living expenses.

Alternatively, the subsidy is effected by paying third parties for expenses incurred in the defined category of living expenses on behalf of the insured person or their nominated beneficiary.

In a third example, the subsidy is effected by calculating the spending of the insured person in the various categories of living expenses for a time period prior to the life changing event and then paying this amount or a percentage of this amount to the insured person or their nominated beneficiary.

The subsidy may have a maximum or minimum amount applicable calculated by determining the spending of the insured person in the various categories of living expenses for a time period prior to the life changing event, such as be six months, for example.

In one embodiment, the method is linked to a credit card of the insured life whereby the subsidy is implemented by paying a portion of the amount spent on the credit card on behalf of the insured person or the nominated beneficiary.

In this example, the amount of spending in any of the categories of living expenses is determined by checking historical spending on the credit card.

A detailed example of the method is illustrated in the tables below.

TABLE 1

Events Covered

| Life Changing Events Covered | Benefit Term |
| --- | --- |
| Death | 12 Months |
| Disability | 12 Months |
| Severe Illness | 12 Months |

TABLE 2

Benefits Provided
Benefits Provided

| Living Expense Category | Benefit Description | Benefit | Maximum benefit per month |
| --- | --- | --- | --- |
| Food/Clothing and other | Shopping Discount | 100% of average monthly spend of the past 12 months, paid monthly | Food/Clothing and other |
| Transport | Petrol | 100% of average | Transport |

TABLE 2-continued

| | Benefits Provided | | |
|---|---|---|---|
| Living Expense Category | Benefit Description | Benefit | Maximum benefit per month |
| | Discount/ Rebate | monthly spend of the past 12 months, paid monthly | |
| Communication | Cell phone Discount | 100% of average monthly spend of the past 12 months, paid monthly | Communication |
| Credit | Repayment of the o/s Credit Balance | 100% of the o/s credit balance up to a maximum of R30 000. | Credit |

In the above example, the living expense category of food and clothing is implemented by giving the insured person or their nominated beneficiary a 100% discount at a chain of shopping stores.

Alternatively, this could be implemented by paying for certain kinds of foods and or clothing.

The methodology works particularly well when implemented in conjunction with a credit card which is issued to the insured person. This is because the insured person can continue to purchase the necessary goods using the credit card and certain entries in the credit card will be automatically paid for by the insurer.

It will be appreciated that the insured person or their nominated beneficiary is provided short term protection following a life changing event so that they are assisted in continuing their day to day living.

Figure 2:
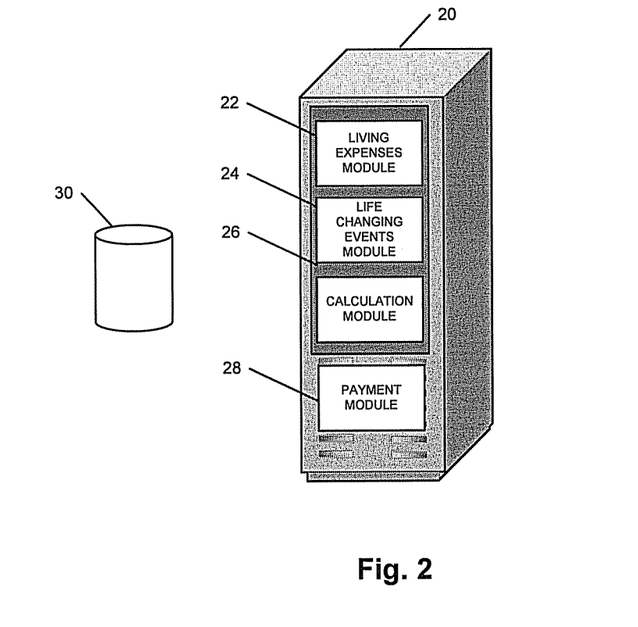
FIG. 2 is a block diagram illustrating an example system to implement the methodologies described herein.

FIG. 2 illustrates an exemplary system for implementing the above methodologies.

A server 20 includes a number of modules to implement the methodologies described above.

A living expenses module 22 defines a plurality of categories of living expenses.

A life changing events module 24 defines a plurality of life changing events.

A calculation module 26, on the occurrence of a life changing event for an insured person of the scheme, calculate an at least partial subsidy of expenses in the category of living expenses for the insured person or a nominated beneficiary of the insured person.

A payment module 28 is used to effect a payment of the at least partial subsidy according to one of the methods described above.

The system may include a database 30 for storing information to allow the methodologies to be implemented.

The modules described above may be implemented by a machine-readable medium embodying instructions which, when executed by a machine, cause the machine to perform any of the methods described above.

It will be appreciated that embodiments of the present invention are not limited to such architecture, and could equally well find application in a distributed, or peer-to-peer, architecture system. Thus the modules illustrated could be located on one or more servers operated by one or more institutions.

The invention claimed is:

1. A method for managing an insurance policy contract for which premiums are paid for a defined benefit, comprising: using at least one computer server, the at least one computer server including software executing from non-transitory media, the software configured to—
   access category data defining living expenses subsidised under the insurance policy pertaining to at least one of the categories of food, clothing, transport, utilities, and communications;
   access insured event data defining death, disease, or disability insured events covered under the insurance policy; and
   on the occurrence of at least one insured event defined within the insured event data, to an insured person of the policy, calculate an at least partial subsidy as a percentage of expenses of the insured or a nominated beneficiary, defined within the at least one category data, as evidenced by historical spending within the at least one category by the insured; and
   cause, upon the occurrence of the at least one insured event, the at least partial subsidy to be paid to the insured person or a nominated beneficiary, over a predetermined period of time, as said living expenses are incurred by the insured or the nominated beneficiary.

2. The method according to claim 1 wherein the at least one category further includes non-mortgage related lodging accommodation expenses.

3. The method according to claim 1, wherein the predetermined period of time is 12 months.

4. The method according to claim 1, wherein the at least partial subsidy is caused to be paid as a reimbursement to the insured person or their nominated beneficiary for expenses incurred in the at least one category.

5. The method according to claim 1, wherein the at least partial subsidy is caused to be paid by third parties for expenses incurred in the defined at least one category on behalf of the insured person or their nominated beneficiary.

6. The method according to claim 1, wherein the at least partial subsidy has a maximum amount applicable calculated by determining the spending of the insured person in the at least one category for a predetermined time period prior to the life changing event.

7. The method according to claim 6, wherein the predetermined time period prior to the life changing event is six months.

8. An electronic system for managing an insurance policy contract for which premiums are paid for a defined benefit, comprising:
   at least one computer server, the at least one computer server including software executing from non-transitory media, the software configured to—
   access category data defining living expenses subsidised under the insurance policy pertaining to at least one of the categories of food, clothing, transport, utilities, and communications;
   access insured event data defining death, disease, or disability insured events covered under the insurance policy; and
   on the occurrence of at least one insured event defined within the insured event data, to an insured person of the policy, calculate an at least partial subsidy as a percentage of the living expenses of the insured or a nominated beneficiary, defined within the at least one category data, as evidenced by historical spending within the at least one category on one or more credit cards used by the insured; and
   cause, upon the occurrence of the at least one insured event, the at least partial subsidy to be paid to the insured person or a nominated beneficiary, over a predetermined period of time, as said living expenses are incurred by the insured or the nominated beneficiary.

9. The system according to claim 8, wherein the at least one category further includes non-mortgage related lodging accommodation expenses.

10. The system according to claim 8, wherein the predetermined period of time is 12 months.

11. The system according to claim 8, wherein the at least partial subsidy is caused to be paid as a reimbursement to the insured person or their nominated beneficiary for expenses incurred in the at least one category.

12. The system according to claim 8, wherein the at least partial subsidy is caused to be paid by third parties for expenses incurred in the at least one category of living expenses on behalf of the insured person or their nominated beneficiary.

13. The system according to claim 8, wherein the at least partial subsidy has a maximum amount applicable calculated by the software based upon the spending of the insured person in the at least one category for a predetermined time period prior to the life changing event.

14. The system according to claim 13 wherein the predetermined time period prior to the life changing event is six months.

15. An electronic system for managing an insurance policy contract for which premiums are paid for a defined benefit, comprising:

at least one computer server, the at least one computer server including software executing from non-transitory media, the software configured to— access category data defining living expenses subsidised under the insurance policy pertaining to at least one of the categories of food, clothing, transport, utilities, and communications;

access insured event data defining death, disease or disability insured events covered under the insurance policy; and on the occurrence of at least one insured event defined within the insured event data, to an insured under the policy, calculate an at least partial subsidy as a percentage of the expenses for the insured or a nominated beneficiary, defined within the at least one category data, as evidenced by historical spending within the at least one category by the insured; and cause, upon the occurrence of the at least one insured event, the at least partial subsidy to be paid to the insured person or a nominated beneficiary, over a predetermined period of time, as said living expenses are incurred by the insured or the nominated beneficiary.

16. A method according to claim 15, wherein the historical spending is evidenced on one or more credit cards used by the insured person or the nominated beneficiary.

* * * * *